United States Patent
Takahashi et al.

(10) Patent No.: US 7,993,783 B2
(45) Date of Patent: Aug. 9, 2011

(54) NON-AQUEOUS ELECTROLYTE SECONDARY BATTERY HAVING POSITIVE ELECTRODE WITH HIGH POTENTIAL

(75) Inventors: Yasufumi Takahashi, Moriguchi (JP); Akira Kinoshita, Moriguchi (JP); Shingo Tode, Moriguchi (JP); Tatsuyuki Kuwahara, Moriguchi (JP); Kazuhiro Hasegawa, Moriguchi (JP); Hiroyuki Fujimoto, Moriguchi (JP); Shin Fujitani, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 1046 days.

(21) Appl. No.: 11/699,000

(22) Filed: Jan. 29, 2007

(65) Prior Publication Data

US 2007/0202406 A1 Aug. 30, 2007

(30) Foreign Application Priority Data

Jan. 30, 2006 (JP) ................................. 2006-020936

(51) Int. Cl.
*H01M 6/16* (2006.01)

(52) U.S. Cl. ................... 429/326; 429/324; 429/231.95; 429/231.3

(58) Field of Classification Search .................. 429/194, 429/231.95, 245, 231.3, 324, 326
See application file for complete search history.

(56) References Cited

U.S. PATENT DOCUMENTS

| | | | | |
|---|---|---|---|---|
| 5,691,084 A | * | 11/1997 | Kita et al. ..................... | 429/326 |
| 2004/0023117 A1 | * | 2/2004 | Imachi et al. ............ | 429/231.95 |
| 2005/0053838 A1 | * | 3/2005 | Ogasawara et al. ........ | 429/231.3 |
| 2005/0069774 A1 | * | 3/2005 | Miyazaki et al. .......... | 429/231.3 |
| 2006/0078795 A1 | | 4/2006 | Takahashi et al. ......... | 429/231.3 |

FOREIGN PATENT DOCUMENTS

| | | |
|---|---|---|
| CN | 1604366 A | 4/2005 |
| JP | 7-272756 A | 10/1995 |
| JP | 2002-237328 | 8/2002 |
| WO | WO 2005117197 A1 * | 12/2005 |

* cited by examiner

*Primary Examiner* — Dah-Wei D Yuan
*Assistant Examiner* — Zachary Best
(74) *Attorney, Agent, or Firm* — Kubovcik & Kubovcik

(57) ABSTRACT

The storage characteristics in a charged state are improved in a non-aqueous electrolyte secondary battery containing a lithium cobalt oxide as a positive electrode active material. The non-aqueous electrolyte secondary battery includes a positive electrode containing a positive electrode active material; a negative electrode containing a negative electrode active material other than metallic lithium; and a non-aqueous electrolyte. The positive electrode active material contains a lithium cobalt oxide as its main component. The non-aqueous electrolyte contains 0.1 to 10 volume % of a compound having an ether group. The positive electrode active material and the negative electrode active material are contained so that the charge capacity ratio of the negative electrode to the positive electrode is from 1.0 to 1.2 when the battery is charged until the potential of the positive electrode reaches 4.4 to 4.5 V (vs. Li/Li$^+$)

16 Claims, No Drawings

NON-AQUEOUS ELECTROLYTE SECONDARY BATTERY HAVING POSITIVE ELECTRODE WITH HIGH POTENTIAL

BACKGROUND OF THE INVENTION

1. Field of the Invention

The present invention relates to non-aqueous electrolyte secondary batteries that contain a lithium cobalt oxide as the positive electrode active material.

2. Description of Related Art

A high energy density battery that has drawn attention in recent years is a non-aqueous electrolyte secondary battery that employs a negative electrode active material composed of a carbon material, metallic lithium, or an alloy capable of absorbing and desorbing lithium ions, and a positive electrode active material made of a lithium-transition metal composite oxide represented by the chemical formula $LiMO_2$ (where M is a transition metal)

A representative example of the lithium-containing transition metal complex oxide is lithium cobalt oxide ($LiCoO_2$), which has been already put to practical use as the positive active material for non-aqueous electrolyte secondary batteries. For non-aqueous electrolyte secondary batteries using a lithium transition metal oxide, such as lithium cobalt oxide, as the positive active material and a carbon material, such as graphite, as the negative active material, an end-of-charge voltage is generally prescribed at 4.1-4.2 V. In this case, the active material of the positive electrode utilizes only 50-60% of its theoretical capacity. Accordingly, if the end-of-charge voltage is increased to a higher value, a capacity (utilization factor) of the positive electrode can be improved to increase the battery capacity and energy density.

However, when the end-of-charge voltage of the battery is increased to a higher value, deterioration in the structure of LiCoO2 and decomposition of the electrolyte solution at the positive electrode surface tend to easily occur. In particular, when the battery is stored in a charged state at high temperature, a problem arises that the charge-discharge performance of the battery degrades due to a battery thickness increase originating from a gas generated by the reaction between the positive electrode and the electrolyte solution, a resistance increase resulting from reaction products, and disintegration of the positive electrode material.

Japanese Published Unexamined Patent Application No. 7-272756 proposes that, in a non-aqueous electrolyte secondary battery using a lithium cobalt oxide as a positive electrode active material and a graphite material as a negative electrode active material, the electrolyte solution contain a compound having an ester group such as an alkyl ester therein, in order to improve the high-temperature storage characteristics in a charged state.

Even with the addition of the compound having an ester group to the electrolyte solution, however, the battery swelling and deterioration in battery performance that originate from high-temperature storage in a charged state are considerable in the case that the charge voltage of the battery is increased to a higher value than conventionally used 4.2 V (that is, in the case that the charge potential of the positive electrode is increased to a higher value than 4.3 V versus a lithium reference [hereinafter expressed as "4.3 V (vs. Li/Li$^+$) "]). Thus, the foregoing technique has been unable to achieve sufficient improvements.

BRIEF SUMMARY OF THE INVENTION

Accordingly, it is an object of the present invention to provide a non-aqueous electrolyte secondary battery that exhibits excellent storage characteristics in a charged state, with a non-aqueous electrolyte secondary battery that contains a lithium cobalt oxide as a positive electrode active material and that is charged until the potential of the positive electrode reaches 4.4 to 4.5 V (vs. Li/Li$^+$).

In order to accomplish the foregoing and other objects, the present invention provides a non-aqueous electrolyte secondary battery comprising a positive electrode containing a positive electrode active material, a negative electrode containing a negative electrode active material other than metallic lithium, and a non-aqueous electrolyte, wherein the positive electrode active material contains a lithium cobalt oxide as its main component, the non-aqueous electrolyte contains 0.1 to 10 volume % of a compound having an ether group, and the positive electrode active material and the negative electrode active material are contained so that the charge capacity ratio of the negative electrode to the positive electrode (negative electrode charge capacity/positive electrode charge capacity) is from 1.0 to 1.2 when the battery is charged until the potential of the positive electrode reaches 4.4 to 4.5 V (vs. Li/Li$^+$)

According to the present invention, the storage characteristics in a charged state are significantly improved in the non-aqueous electrolyte secondary battery that contains a lithium cobalt oxide as a positive electrode active material and that is charged until the potential of the positive electrode reaches 4.4 to 4.5 V (vs. Li/Li$^+$).

DETAILED DESCRIPTION OF THE INVENTION

The non-aqueous electrolyte secondary battery according to the present invention comprises a positive electrode containing a positive electrode active material, a negative electrode containing a negative electrode active material other than metallic lithium, and a non-aqueous electrolyte. The positive electrode active material contains a lithium cobalt oxide as its main component. The non-aqueous electrolyte contains 0.1 to 10 volume % of a compound having an ether group. The positive electrode active material and the negative electrode active material are contained in the battery so that the charge capacity ratio of the negative electrode to the positive electrode (negative electrode charge capacity/positive electrode charge capacity) is from 1.0 to 1.2 when the battery is charged until the potential of the positive electrode reaches 4.4 to 4.5 V (vs. Li/Li$^+$).

It is believed that when the non-aqueous electrolyte secondary battery containing a lithium cobalt oxide as a positive electrode active material is stored at high temperature in a charged state, battery thickness increase and capacity degradation take place because the oxidation state of the cobalt in the active material is increased by charging, and the catalysis of the cobalt with high oxidation state in the active material brings about decomposition of the electrolyte solution, clogging of the separator, deposition of a by-product on the negative electrode, and so forth, leading to degradation in discharge performance.

By allowing the non-aqueous electrolyte to contain a compound having an ether group in a predetermined amount according to the present invention, the non-aqueous electrolyte secondary battery that is charged until the potential of the positive electrode reaches 4.4 to 4.5 V (vs. Li/Li$^+$) is prevented from the battery thickness increase and the capacity degradation as described above that occur when stored at high temperature. Although the details of why such an effect is obtained by allowing the non-aqueous electrolyte to contain a compound having an ether group according to the present invention are not clear, it is believed that the compound having an ether group contained in the non-aqueous electrolyte decomposes when the initial charging is carried out at a charge voltage higher than that used conventionally, forming a surface film containing carbon and oxygen on the surface of the positive electrode active material and preventing side reactions between the positive electrode and the non-aqueous electrolyte. Such an effect cannot be obtained with a compound having an ester group even if the compound similarly contains carbon and oxygen.

The compound having an ether group has been generally considered inappropriate for use in a secondary battery that uses a positive electrode material having a high battery reaction potential, such as a lithium cobalt oxide, because it has a higher vapor pressure and a lower oxidative decomposition potential and is more susceptible to anodic oxidation than the carbonates that are currently used as the solvents. However, with the non-aqueous electrolyte secondary battery that is charged until the potential of the positive electrode reaches 4.4 to 4.5 V (vs. Li/Li$^+$) as in the present invention, the storage characteristics in a charged state can be improved by allowing the non-aqueous electrolyte to contain a compound having an ether group in a predetermined amount according to the present invention.

In the present invention, the lithium cobalt oxide is contained in the positive electrode as the main component of the positive electrode active material, and it is preferable that the lithium cobalt oxide be contained as the positive electrode active material in an amount of 60 weight % or greater. In addition, it is preferable that in the present invention, the lithium cobalt oxide contains zirconium and magnesium. It is preferable that the amount of zirconium contained in the lithium cobalt oxide be within the range of from 0.01 mole % to 2.0 mole % with respect to the transition metals. The content of magnesium is preferably within the range of from 0.1 mole % to 2.0 mole %. If the amounts of these elements are too small, the effect of suppressing capacity degradation may not be obtained sufficiently. On the other hand, if the amounts of these elements are too large, they may cause adverse effects on the discharge characteristics of the positive electrode.

In addition, it is preferable that zirconium (Zr) in particulate form be adhered on the surface of the lithium cobalt oxide by sintering. When the zirconium-containing compound is adhered on the surface of the lithium cobalt oxide, lithium ions and electrons are transferred smoothly at the surface of the lithium cobalt oxide during charge and discharge, and the oxidation decomposition of the electrolyte solution can be suppressed.

Moreover, it has been confirmed that magnesium (Mg) is present both in the lithium cobalt oxide and in the zirconium-containing compound on the surface of the lithium cobalt oxide. It has been confirmed that because Mg diffuses into both of them, the zirconium-containing compound and the lithium cobalt oxide are firmly sintered. Thus, the addition of Mg enhances the adhesion between the zirconium-containing compound and the lithium cobalt oxide, significantly enhancing the effect of suppressing the decomposition of the electrolyte solution.

It is preferable that the lithium cobalt oxide usable in the present invention be represented by the chemical formula $Li_aCo_{1-x-y-z}Zr_xMg_yM_zO_2$, where M is at least one element selected from the group consisting of Al, Ti, and Sn; $0 \leq a \leq 1.1$; $x>0$; $y>0$; $z \geq 0$; and $0<x+y+z \leq 0.03$.

Examples of the compound containing an ether group that is contained in the non-aqueous electrolyte in the present invention include diethyl ether and tetrahydrofuran. Although these compounds that contain ether groups have low boiling points (the boiling point of diethyl ether is 34.5° C, and the boiling point of tetrahydrofuran is 66° C), they are capable of suppressing battery swelling during high-temperature storage, in comparison with the batteries that do not contain the compound having an ether group. Accordingly, it is believed that most of the compound containing an ether group that has been added to the non-aqueous electrolyte is decomposed before the storage, in other words, is decomposed during the initial charging.

The content of the compound having an ether group in the non-aqueous electrolyte is 0.1 to 10 volume %. More preferable values of the content can vary depending on the type of the compound having an ether group. For example, in the case of diethyl ether, the content is preferably from 1 volume % to 10 volume %, while in the case of tetrahydrofuran, the content is preferably from 0.1 volume % to 1 volume %. If the content of the compound having an ether group is too low, the effect of suppressing the battery swelling and the capacity degradation cannot be sufficiently obtained. On the other hand, if the content is too high, the surface film formed on the positive electrode surface becomes too great, which may cause adverse effects on the battery performance.

The compound having an ether group that is used in the present invention is preferably a compound having a hydrocarbon chain. Examples thereof include diethyl ether, ethyl methyl ether, dimethoxyethane, diethylene glycol dimethyl ether, triethylene glycol dimethyl ether, tetraethylene glycol dimethyl ether, ethylene glycol dimethyl ether, 1,3-dioxolane, tetrahydrofuran, 2-methyltetrahydrofuran, 12-crown-4-ether, and 15-crown-5-ether. Particularly preferred among these is at least one compound selected from the group consisting of diethyl ether, 2-methyltetrahydrofuran, tetrahydrofuran, diethylene glycol dimethyl ether, 1,4-dioxane, 12-crown-4-ether, and 15-crown-5-ether.

In the present invention, it is preferable that the non-aqueous electrolyte further contain 0.5 to 4 weight % of vinylene carbonate. The reason is that vinylene carbonate decomposes and forms a surface film on the negative electrode surface, suppressing the reaction between the negative electrode and the electrolyte solution during high-temperature storage in a charged state. For the same reason, it is preferable that the solvent used for the non-aqueous electrolyte contain ethylene carbonate.

In the present invention, a commonly used solvent in the non-aqueous electrolyte is a mixed solvent of a cyclic carbonate, such as ethylene carbonate and propylene carbonate, and a chain carbonate, such as dimethyl carbonate, ethyl methyl carbonate, and diethyl carbonate. In the present invention, it is particularly preferable that the non-aqueous electrolyte contain diethyl carbonate as the chain carbonate. Allowing the non-aqueous electrolyte to contain diethyl carbonate can more effectively prevent the oxidation decomposition of the electrolyte solution in a highly charged state and at a high temperature. The content of diethyl carbonate in the solvent is preferably within the range of from 10 volume % to 70 volume %.

In the present invention, a preferable example of the negative electrode active material is a graphite material. The above-mentioned vinylene carbonate can form a desirable surface film on the surface of the graphite material.

Examples of the solute in the non-aqueous electrolyte usable in the present invention include $LiPF_6$, $LiBF_4$, $LiCF_2SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. Among these, $LiPF_6$ (lithium hexafluorophosphate) is particularly preferable.

In the present invention, the positive electrode active material and the negative electrode active material are contained in the battery so that the charge capacity ratio of the negative electrode to the positive electrode (negative electrode charge capacity/positive electrode charge capacity) is from 1.0 to 1.2 when the battery is charged until the potential of the positive electrode reaches 4.4 to 4.5 V (vs. Li/Li$^+$). The charge capacity ratio is the charge capacity ratio of the portions where the positive electrode and the negative electrode face each other. Setting the charge capacity ratio of the negative electrode to the positive electrode to be 1.0 or greater serves to prevent metallic lithium from depositing on the negative electrode surface. Also, setting the charge capacity ratio to be 1.2 or less serves to prevent the energy density from lowering as a result of an excessive amount of the negative electrode active material. When a graphite material is used as a negative electrode active material, the end-of-charge voltage is set at from 4.3 V to 4.4 V. If the end-of-charge voltage is higher than 4.4 V, the effect of suppressing decomposition of the electrolyte solution and disintegration of the positive electrode becomes insufficient; therefore, it is preferable that the end-of-charge voltage be 4.4 V or lower.

EXAMPLES

Hereinbelow, the present invention is described in further detail based on examples thereof. It should be construed, however, that the present invention is not limited to the following examples but various changes and modifications are possible without departing from the scope of the invention.

Example 1

Preparation of Positive Electrode Active Material $Li_2CO_3$, $Co_3O_4$, $ZrO_2$, and MgO were mixed in an Ishikawa-type automated mortar so that the mole ratio of Li:Co:Zr:Mg became 1:0.993:0.002:0.005. Thereafter, the resultant mixture was sintered in an air atmosphere at 850° C for 20 hours, and then pulverized, whereby a lithium cobalt oxide having an average particle size of about 6.4 μm was obtained. The resultant lithium cobalt oxide had a formula of $LiCo_{0.993}Zr_{0.002}Mg_{0.005}O_2$ and a BET specific surface area of 0.42 m$^2$/g.

Preparation of Positive Electrode

Carbon (acetylene black) as a conductive agent, polyvinylidene fluoride as a binder agent, and N-methyl-2-pyrrolidone as a dispersion medium were added to the positive electrode active material thus obtained so that the active material, the conductive agent, and the binder agent were mixed in a weight ratio f 90:5:5, and thereafter the mixture was kneaded to prepare a positive electrode slurry. The prepared slurry was applied onto an aluminum foil serving as a current collector, and then dried. Thereafter, the resultant material was pressure-rolled using pressure rollers, and a current collector tab was attached thereto. Thus, a positive electrode was prepared.

Preparation of Negative Electrode

Artificial graphite (average particle size of 21 μm and BET specific surface area of 4.0 m$^2$/g) as a negative electrode active material and styrene-butadiene rubber as a binder were added to an aqueous solution of carboxymethylcellulose, serving as a thickening agent, so that the active material, the binder, and the thickening agent were mixed in a weight ratio of 95:3:2. Thereafter, the mixture was kneaded to prepare a negative electrode slurry. The slurry thus prepared was applied onto a copper foil serving as a current collector, and then dried. Thereafter, the resultant material was pressure-rolled using pressure rollers, and a current collector tab was attached thereto. Thus, a negative electrode was prepared.

Preparation of Electrolyte Solution

Lithium hexafluorophosphate ($LiPF_6$) was dissolved at a concentration of 1 mole/liter into a mixed solvent of 3:7 volume ratio of ethylene carbonate (EC) and diethyl carbonate (DEC) Further, 2.0 weight % of vinylene carbonate (VC) and 1.0 volume % of diethyl ether with respect to the electrolyte solution were added to the mixture. Thus, an electrolyte solution was prepared.

Preparation of Battery

The positive electrode and the negative electrode prepared in the above-described manner were wound together in such a manner that they oppose each other across a separator interposed therebetween so that the ratio of negative electrode charge capacity/positive electrode charge capacity became 1.0 when the charge voltage was set at 4.4 V (when the potential of the positive electrode was set at 4.5 V (vs. Li/Li$^+$)), to prepare a wound assembly. Then, in a glove box under an Ar (argon) atmosphere, the wound assembly and the electrolyte solution were sealed into an aluminum laminate whereby a non-aqueous electrolyte secondary battery A1 in a battery standard size of 3.6 mm thickness×3.5 cm width×6.2 cm length was obtained.

Evaluation of Storage Characteristics in Charged State

The non-aqueous electrolyte secondary battery thus prepared was charged at a constant current of 650 mA until the battery voltage reached 4.4 V, then further charged at a constant voltage of 4.4 V until the current became 32 mA. Thereafter, the battery was discharged at a constant current of 650 mA until the battery voltage reached 2.75 V, in order that the discharge capacity (mAh) of the battery before storage was measured.

Furthermore, the battery was charged to 4.4 V in the foregoing manner, and the thickness of the battery before storage was measured.

The battery was stored for 5 days in a thermostatic chamber at an elevated temperature of 60° C and was thereafter taken out. After the battery was sufficiently cooled, the battery thickness was measured. The battery swelling rate thereof was obtained by dividing the difference between the battery thickness after storage in a charged state and the battery thickness before storage in a charged state by the battery thickness before storage in a charged state.

The battery that had been cooled was discharged at a constant current of 650 mA until the battery voltage lowered to 2.75 V, to determine the discharge capacity (mAh) of the battery after storage. The discharge capacity obtained after storage in a charged state was defined as the remaining capacity, and the capacity retention rate was obtained by dividing the remaining capacity by the discharge capacity before storage.

Table 1 below shows the battery swelling rate and the capacity retention rate.

Example 2

An electrolyte solution was prepared in the same manner as described in Example 1, except that 2.0 volume % of diethyl ether was added to the electrolyte solution in the preparation of the electrolyte solution.

Using the electrolyte solution thus prepared, a non-aqueous electrolyte secondary battery A2 was fabricated in the same manner as described in Example 1, and the storage characteristics in a charged state were evaluated.

Example 3

An electrolyte solution was prepared in the same manner as described in Example 1, except that the amount of the additive compound diethyl ether was 5.0 volume % in the preparation of the electrolyte solution.

Using the electrolyte solution thus prepared, a non-aqueous electrolyte secondary battery A3 was fabricated in the same manner as described in Example 1, and the storage characteristics in a charged state were evaluated.

Example 4

An electrolyte solution was prepared in the same manner as described in Example 1, except that the amount of the additive compound diethyl ether was 10.0 volume % in the preparation of the electrolyte solution.

Using the electrolyte solution thus prepared, a non-aqueous electrolyte secondary battery A4 was fabricated in the same manner as described in Example 1, and the storage characteristics in a charged state were evaluated.

Example 5

An electrolyte solution was prepared in the same manner as described in Example 1, except that 0.1 volume % of 2-methyl-tetrahydrofuran (2Me-THF) was used as the additive compound in place of diethyl ether in the preparation of the electrolyte solution.

Using the electrolyte solution thus prepared, a non-aqueous electrolyte secondary battery A5 was fabricated in the same manner as described in Example 1, and the storage characteristics in a charged state were evaluated.

Example 6

An electrolyte solution was prepared in the same manner as described in Example 1, except that 0.5 volume % of 2-methyl-tetrahydrofuran (2Me-THF) was used as the additive compound in place of diethyl ether in the preparation of the electrolyte solution.

Using the electrolyte solution thus prepared, a non-aqueous electrolyte secondary battery A6 was fabricated in the same manner as described in Example 1, and the storage characteristics in a charged state were evaluated.

Example 7

An electrolyte solution was prepared in the same manner as described in Example 1, except that 1.0 volume % of 2-methyl-tetrahydrofuran (2Me-THF) was used as the additive compound in place of diethyl ether in the preparation of the electrolyte solution.

Using the electrolyte solution thus prepared, a non-aqueous electrolyte secondary battery A7 was fabricated in the same manner as described in Example 1, and the storage characteristics in a charged state were evaluated.

Example 8

An electrolyte solution was prepared in the same manner as described in Example 1, except that 0.1 volume % of tetrahydrofuran (THF) was used as the additive compound in place of diethyl ether in the preparation of the electrolyte solution.

Using the electrolyte solution thus prepared, a non-aqueous electrolyte secondary battery A8 was fabricated in the same manner as described in Example 1, and the storage characteristics in a charged state were evaluated.

Example 9

An electrolyte solution was prepared in the same manner as described in Example 1, except that 0.5 volume % of tetrahydrofuran (THF) was used as the additive compound in place of diethyl ether in the preparation of the electrolyte solution.

Using the electrolyte solution thus prepared, a non-aqueous electrolyte secondary battery A9 was fabricated in the same manner as described in Example 1, and the storage characteristics in a charged state were evaluated.

Example 10

An electrolyte solution was prepared in the same manner as described in Example 1, except that 1.0 volume % of tetrahydrofuran (THF) was used as the additive compound in place of diethyl ether in the preparation of the electrolyte solution.

Using the electrolyte solution thus prepared, a non-aqueous electrolyte secondary battery A10 was fabricated in the same manner as described in Example 1, and the storage characteristics in a charged state were evaluated.

Example 11

An electrolyte solution was prepared in the same manner as described in Example 1, except that 1.0 volume % of 1,4-dioxane (1,4-DO) was used as the additive compound in place of diethyl ether in the preparation of the electrolyte solution.

Using the electrolyte solution thus prepared, a non-aqueous electrolyte secondary battery A11 was fabricated in the same manner as described in Example 1, and the storage characteristics in a charged state were evaluated.

Example 12

An electrolyte solution was prepared in the same manner as described in Example 1, except that 1.0 volume % of diethylene glycol dimethyl ether (DDE) was used as the additive compound in place of diethyl ether in the preparation of the electrolyte solution.

Using the electrolyte solution thus prepared, a non-aqueous electrolyte secondary battery A12 was fabricated in the same manner as described in Example 1, and the storage characteristics in a charged state were evaluated.

Example 13

An electrolyte solution was prepared in the same manner as described in Example 1, except that 1.0 volume % of 12-crown-4-ether was used as the additive compound in place of diethyl ether in the preparation of the electrolyte solution.

Using the electrolyte solution thus prepared, a non-aqueous electrolyte secondary battery A13 was fabricated in the same manner as described in Example 1, and the storage characteristics in a charged state were evaluated.

Example 14

An electrolyte solution was prepared in the same manner as described in Example 1, except that 1.0 volume % of 15-crown-5-ether was used as the additive compound in place of diethyl ether in the preparation of the electrolyte solution.

Using the electrolyte solution thus prepared, a non-aqueous electrolyte secondary battery A14 was fabricated in the same manner as described in Example 1, and the storage characteristics in a charged state were evaluated.

Comparative Example 1

An electrolyte solution was prepared in the same manner as described in Example 1, except that 2 weight % of vinylene carbonate (VC) alone was used as the additive compound in the preparation of the electrolyte solution.

Using the electrolyte solution thus prepared, a non-aqueous electrolyte secondary battery X1 was fabricated in the same manner as described in Example 1, and the storage characteristics in a charged state were evaluated.

Comparative Example 2

An electrolyte solution was prepared in the same manner as described in Example 1, except that 2 weight % of vinylene carbonate (VC) and 1 volume % of methyl acetate were used as the additive compounds in the preparation of the electrolyte solution.

Using the electrolyte solution thus prepared, a non-aqueous electrolyte secondary battery X2 was fabricated in the same manner as described in Example 1, and the storage characteristics in a charged state were evaluated.

Comparative Example 3

An electrolyte solution was prepared in the same manner as described in Example 1, except that 2 weight % of vinylene carbonate (VC) and 1 volume % of ethyl propionate were used as the additive compounds in the preparation of the electrolyte solution.

Using the electrolyte solution thus prepared, a non-aqueous electrolyte secondary battery X3 was fabricated in the same manner as described in Example 1, and the storage characteristics in a charged state were evaluated.

Table 1 below shows the evaluation results of the storage characteristics in a charged state for the non-aqueous electrolyte secondary batteries A1 to A14 of Examples 1 to 14 as well as the non-aqueous electrolyte secondary batteries X1 to X3 of Comparative Examples 1 to 3, prepared in the above-described manners.

The values of battery swelling rate and capacity retention rate in the table are expressed in percentages.

TABLE 1

| | Battery | Additive to electrolyte solution (Amount added) | Battery swelling rate after 5-day storage at 60° C. (%) | Capacity retention rate after 5-day storage at 60° C. (%) |
|---|---|---|---|---|
| Ex. 1 | A1 | VC (2.0 wt. %), diethyl ether (1.0 vol. %) | 28.4 | 67.7 |
| Ex. 2 | A2 | VC (2.0 wt. %), diethyl ether (2.0 vol. %) | 11.0 | 68.5 |
| Ex. 3 | A3 | VC (2.0 wt. %), diethyl ether (5.0 vol. %) | 5.2 | 68.0 |
| Ex. 4 | A4 | VC (2.0 wt. %), diethyl ether (10 vol. %) | 9.3 | 60.2 |
| Ex. 5 | A5 | VC (2.0 wt. %), 2Me-THF (0.1 vol. %) | 34.6 | 65.9 |
| Ex. 6 | A6 | VC (2.0 wt. %), 2Me-THF (0.5 vol. %) | 24.4 | 69.4 |
| Ex. 7 | A7 | VC (2.0 wt. %), 2Me-THF (1.0 vol. %) | 25.1 | 70.2 |
| Ex. 8 | A8 | VC (2.0 wt. %), THF (0.1 vol. %) | 39.9 | 71.7 |
| Ex. 9 | A9 | VC (2.0 wt. %), THF (0.5 vol. %) | 23.4 | 73.3 |
| Ex. 10 | A10 | VC (2.0 wt. %), THF (1.0 vol. %) | 13.7 | 71.6 |
| Ex. 11 | A11 | VC (2.0 wt. %), 1,4 DO (1.0 vol. %) | 24.3 | 62.7 |
| Ex. 12 | A12 | VC (2.0 wt. %), DDE (1.0 vol. %) | 32.0 | 72.2 |
| Ex. 13 | A13 | VC (2.0 wt. %) 12-crown-4-ether (1.0 vol. %) | 25.2 | 72.5 |
| Ex. 14 | A14 | VC (2.0 wt. %), 15-crown-5-ether (1.0 vol. %) | 8.4 | 60.6 |
| Comp. Ex. 1 | X1 | VC (2.0 wt. %) | 43.4 | 59.5 |
| Comp. Ex. 2 | X2 | VC (2.0 wt. %), methyl acetate (1.0 vol. %) | 52.3 | 58.5 |
| Comp. Ex. 3 | X3 | VC (2.0 wt. %), ethyl propionate (1.0 vol. %) | 54.9 | 58.7 |

The results shown in Table 1 clearly demonstrate that the batteries A1 to A14 of Examples 1 to 14 according to the present invention exhibited smaller battery swelling rates and better capacity retention rates than those of the batteries X1 to X3 of Comparative Examples 1 to 3. Although a compound having an ester group was added in Comparative Examples 2 and 3, the advantageous effects of the present invention were not obtained even with the addition of the compound having an ester group.

In addition, in Examples 1 to 14 according to the present invention, the battery swelling rates were smaller than those in Comparative Examples 1 to 3. It is believed that, in each battery according to the present invention, the compound having an ether group, which is a low-boiling point component, was decomposed during the initial charging.

REFERENCE EXPERIMENT

Reference Example 1

A non-aqueous electrolyte secondary battery B1 was fabricated in the same manner as described in Example 4, except that the positive electrode and the negative electrode were prepared so that the ratio of negative electrode charge capacity/positive electrode charge capacity became 1.1 when the charge voltage was set at 4.2 V.

Reference Example 2

A non-aqueous electrolyte secondary battery Y1 was fabricated in the same manner as described in Comparative Example 1, except that the positive electrode and the negative electrode were prepared so that the ratio of negative electrode charge capacity/positive electrode charge capacity became 1.1 when the charge voltage was set at 4.2 V.

Table 2 below shows the evaluation results of the storage characteristics in a charged state for the non-aqueous electrolyte secondary batteries B1 and Y1 of Reference Examples 1 and 2, respectively, prepared in the above-described manners.

The values of battery swelling rate and capacity retention rate in the table are expressed in percentage.

TABLE 2

| Battery | Additive to electrolyte solution (Amount added) | Battery swelling rate after 5-day storage at 60° C. (%) | Capacity retention rate after 5-day storage at 60° C. (%) |
| --- | --- | --- | --- |
| Ref. Ex. 1 B1 | VC (2.0 wt. %), diethyl ether (10.0 vol. %) | 27.8 | 78.2 |
| Ref. Ex. 2 Y1 | VC (2.0 wt. %) | 2.8 | 91.8 |

As clearly seen from the results shown in Table 2, even the addition of the compound having an ether group to the non-aqueous electrolyte cannot prevent the swelling of the battery, causes the degradation of the capacity retention rate, and cannot obtain the advantageous effect of the present invention, when the battery is charged according to the conventionally common charge condition of a charge voltage of 4.2 V, in other words, when the battery is charged so that the potential of the positive electrode becomes 4.3 V (vs. Li/Li$^+$). It is believed that when the battery is charged at a charge voltage of 4.2 V, the added compound having an ether group does not sufficiently decompose during the initial charging and remains in the electrolyte solution, and this remnant of the added compound vaporizes or reacts with the positive electrode during the high-temperature storage, causing gas generation and exacerbating battery deterioration.

For the reason described above, it will be appreciated that the effect of adding a compound having an ether group to the electrolyte solution according to the present invention is exhibited in the battery systems in which the charge voltage is higher than conventionally used 4.2 V.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese Patent Application No. 2006-020936 filed Jan. 30, 2006, which is incorporated herein by reference.

What is claimed is:

1. A non-aqueous electrolyte secondary battery comprising:
   a positive electrode containing a positive electrode active material;
   a negative electrode containing a negative electrode active material other than metallic lithium; and
   a non-aqueous electrolyte, wherein:
   the positive electrode active material contains a lithium cobalt oxide as its main component and having a potential of 4.4 to 4.5 V (vs. Li/Li$^+$);
   the non-aqueous electrolyte contains 0.1 to 10 volume % of compound having an ether group; and the battery is charged until the potential of the positive electrode reaches 4.4 to 4.5 V (vs. Li/Li$^+$), wherein the compound having an ether group is at least one compound selected from the group consisting of diethyl ether, 2-methyltetrahydrofuran, tetrahydrofuran, diethylene glycol dimethyl ether, 1,4-dioxane, 12-crown-4-ether, and 15-crown-5-ether.

2. The non-aqueous electrolyte secondary battery according to claim 1, wherein the lithium cobalt oxide is represented by the chemical formula $Li_aCo_{1-x-y-z}Zr_xMg_yM_zO_2$, where M is at least one element selected from the group consisting of Al, Ti, and Sn; $0 \leq a \leq 1.1$; $x>0$; $y>0$; $z \geq 0$; and $0<x+y+z \leq 0.03$.

3. The non-aqueous electrolyte secondary battery according to claim 2, wherein the lithium cobalt oxide has a zirconium-containing compound in particulate form that has been sintered on a surface thereof.

4. The non-aqueous electrolyte secondary battery according to claim 1, wherein the negative electrode active material is a graphite material, and a battery voltage is 4.3 to 4.4 V when the potential of the positive electrode reaches 4.4 to 4.5 V (vs. Li/Li$^+$).

5. The non-aqueous electrolyte secondary battery according to claim 1, wherein the non-aqueous electrolyte contains diethyl carbonate as a solvent.

6. The non-aqueous electrolyte secondary battery according to claim 1, wherein the non-aqueous electrolyte contains 1 to 10 volume % of diethyl ether as the compound having an ether group.

7. The non-aqueous electrolyte secondary battery according to claim 1, wherein the non-aqueous electrolyte contains 0.1 to 1 volume % of tetrahydrofuran as the compound having an ether group.

8. The non-aqueous electrolyte secondary battery according to claim 1, wherein the non-aqueous electrolyte further contains 0.5 to 4 weight % of vinylene carbonate.

9. The non-aqueous electrolyte secondary battery according to claim 2, wherein the negative electrode active material is a graphite material, and a battery voltage is 4.3 to 4.4 V when the potential of the positive electrode reaches 4.4 to 4.5 V (vs. Li/Li$^+$).

10. The non-aqueous electrolyte secondary battery according to claim 2, wherein the non-aqueous electrolyte contains diethyl carbonate as a solvent.

11. The non-aqueous electrolyte secondary battery according to claim 2, wherein the non-aqueous electrolyte further contains 0.5 to 4 weight % of vinylene carbonate.

12. The non-aqueous electrolyte secondary battery according to claim 3, wherein the negative electrode active material is a graphite material, and a battery voltage is 4.3 to 4.4 V when the potential of the positive electrode reaches 4.4 to 4.5 V (vs. Li/Li$^+$).

13. The non-aqueous electrolyte secondary battery according to claim 3, wherein the non-aqueous electrolyte contains diethyl carbonate as a solvent.

14. The non-aqueous electrolyte secondary battery according to claim 3, wherein the non-aqueous electrolyte further contains 0.5 to 4 weight % of vinylene carbonate.

15. The non-aqueous electrolyte secondary battery according to claim 4, wherein the non-aqueous electrolyte further contains 0.5 to 4 weight % of vinylene carbonate.

16. A method of increasing charge voltage and battery capacity of a non-aqueous electrolyte secondary battery comprising a positive electrode containing lithium cobalt oxide as a primary positive electrode active material and having a potential of 4.4 to 4.5 V (vs. Li/Li$^+$), a negative electrode containing a negative electrode active material other than metallic lithium, and a non-aqueous electrolyte, comprising:
   adding 0.1 to 10 volume % of a compound having an ether group to the non-aqueous electrolyte;

charging the battery until the potential of the positive electrode reaches 4.4 to 4.5 V (vs. Li/Li$^+$), and maintaining the amounts of the positive electrode active material and the negative electrode active material such that when the battery is charged to said potential of the positive electrode the charge capacity ratio of the negative electrode to the positive electrode is from 1.0 to 1.2, wherein the compound having an ether group is at least one compound selected from the group consisting of diethyl ether, 2-methyltetrahydrofuran, tetrahydrofuran, diethylene glycol dimethyl ether, 1,4-dioxane, 12-crown-4-ether, and 15-crown-5-ether.

* * * * *